(12) United States Patent
Ishii

(10) Patent No.: US 8,547,610 B2
(45) Date of Patent: Oct. 1, 2013

(54) IMAGE PROCESSING APPARATUS

(75) Inventor: Hiroshi Ishii, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 209 days.

(21) Appl. No.: 13/067,236

(22) Filed: May 18, 2011

(65) Prior Publication Data

US 2011/0292478 A1 Dec. 1, 2011

(30) Foreign Application Priority Data

Jun. 1, 2010 (JP) .................................. 2010-125794
Apr. 18, 2011 (JP) .................................. 2011-092411

(51) Int. Cl.
*G06F 3/08* (2006.01)
(52) U.S. Cl.
USPC ......................................................... 358/518
(58) Field of Classification Search
None
See application file for complete search history.

(56) References Cited

U.S. PATENT DOCUMENTS

| | | | | |
|---|---|---|---|---|
| 7,006,246 B1 * | 2/2006 | Nakajima | ....................... | 358/1.9 |
| 7,760,400 B2 | 7/2010 | Ishii et al. | | |
| 7,881,553 B2 | 2/2011 | Ishii | | |
| 2006/0227386 A1 * | 10/2006 | Nuuja et al. | .................. | 358/406 |

FOREIGN PATENT DOCUMENTS

| | | | |
|---|---|---|---|
| JP | 3241986 A | | 10/2001 |
| JP | 2005-260305 | * | 9/2005 |
| JP | 4238996 A | | 1/2009 |

* cited by examiner

*Primary Examiner* — Tammy Pham
*Assistant Examiner* — Edwin S Leland, III
(74) *Attorney, Agent, or Firm* — Harness, Dickey & Pierce

(57) ABSTRACT

An image processing apparatus includes: an output unit that outputs a tone-correction-parameter generation sheet and a scanner-profile generation sheet identical in layout of patch columns, each containing patches of different tone values, formed thereon; a scanning unit that scans the patches at scanner positions on a platen; a scanner-profile creating unit that creates, for each of the scanner positions, a scanner profile specifying a relationship between readout values of patches on the scanner-profile generation sheet and color measurement values of the patches measured with a colorimeter; a color-measurement-value deriving unit that determines, from readout values of the patches on the tone-correction-parameter generation sheet and the scanner profiles for the scanner positions, color measurement values of the patches; and a calculating unit that calculates a tone correction parameter for correcting differences between the color measurement values and target color measurement values for the patches on the tone-correction-parameter generation sheet.

3 Claims, 11 Drawing Sheets

| PATCH | TONE VALUE |
|---|---|
| K00 | 0 |
| K01 | 16 |
| K02 | 32 |
| K03 | 48 |
| K04 | 64 |
| K05 | 80 |
| K06 | 96 |
| K07 | 112 |
| K08 | 128 |
| K09 | 143 |
| K10 | 159 |
| K11 | 175 |
| K12 | 191 |
| K13 | 207 |
| K14 | 223 |
| K15 | 239 |
| K16 | 255 |

FIG.5

| PATCH | TONE VALUE | MEASURED DENSITY |
|---|---|---|
| K00 | 0 | 0.056 |
| K01 | 16 | 0.080 |
| K02 | 32 | 0.118 |
| K03 | 48 | 0.188 |
| K04 | 64 | 0.244 |
| K05 | 80 | 0.322 |
| K06 | 96 | 0.402 |
| K07 | 112 | 0.504 |
| K08 | 128 | 0.611 |
| K09 | 143 | 0.722 |
| K10 | 159 | 0.832 |
| K11 | 175 | 0.927 |
| K12 | 191 | 1.042 |
| K13 | 207 | 1.160 |
| K14 | 223 | 1.286 |
| K15 | 239 | 1.437 |
| K16 | 255 | 1.597 |

FIG.8

| SCANNER POSITION | REFERENCE POSITION MARKER "A" | | | REFERENCE POSITION MARKER "B" | | | REFERENCE POSITION MARKER "C" | | |
|---|---|---|---|---|---|---|---|---|---|
| | PATCH | TONE VALUE | READOUT VALUE | PATCH | TONE VALUE | READOUT VALUE | PATCH | TONE VALUE | READOUT VALUE |
| POS00 | K00 | 0 | 252 | | | | | | |
| POS01 | K01 | 16 | 205 | K00 | 0 | 249 | K01 | 16 | 206 |
| POS02 | K02 | 32 | 164 | K01 | 16 | 208 | K02 | 32 | 194 |
| POS03 | K03 | 48 | 166 | K02 | 32 | 192 | K03 | 48 | 169 |
| POS04 | K04 | 64 | 140 | K03 | 48 | 166 | K04 | 64 | 144 |
| POS05 | K05 | 80 | 110 | K04 | 64 | 141 | K05 | 80 | 110 |
| POS06 | K06 | 96 | 101 | K05 | 80 | 111 | K06 | 96 | 100 |
| POS07 | K07 | 112 | 90 | K06 | 96 | 99 | K07 | 112 | 87 |
| POS08 | K08 | 128 | 75 | K07 | 112 | 88 | K08 | 128 | 77 |
| POS09 | K09 | 143 | 62 | K08 | 128 | 76 | K09 | 143 | 63 |
| POS10 | K10 | 159 | 51 | K09 | 143 | 62 | K10 | 159 | 51 |
| POS11 | K11 | 175 | 44 | K10 | 159 | 49 | K11 | 175 | 47 |
| POS12 | K12 | 191 | 34 | K11 | 175 | 44 | K12 | 191 | 31 |
| POS13 | K13 | 207 | 28 | K12 | 191 | 33 | K13 | 207 | 29 |
| POS14 | K14 | 223 | 22 | K13 | 207 | 27 | K14 | 223 | 24 |
| POS15 | K15 | 239 | 20 | K14 | 223 | 24 | K15 | 239 | 20 |
| POS16 | K16 | 255 | 18 | K15 | 239 | 20 | K16 | 255 | 18 |

FIG.11

```
START
  ↓
TONE-CORRECTION-PARAMETER
GENERATION SHEET OUTPUT              — S201
  ↓
TONE-CORRECTION-PARAMETER
GENERATION SHEET INTPUT              — S202
  ↓
DERIVE COLOR MEASUREMENT VALUES      — S203
  ↓
CALCULATE TONE CORRECTION PARAMETER  — S204
  ↓
SET TONE CORRECTION PARAMETER        — S206
  ↓
END
```

FIG.12

| SCANNER POSITION | PATCH | TONE VALUE | READOUT VALUE |
|---|---|---|---|
| POS00 | K00 | 0 | 250 |
| POS01 | K01 | 16 | 207 |
| POS02 | K02 | 32 | 191 |
| POS03 | K03 | 48 | 166 |
| POS04 | K04 | 64 | 141 |
| POS05 | K05 | 80 | 109 |
| POS06 | K06 | 96 | 100 |
| POS07 | K07 | 112 | 88 |
| POS08 | K08 | 128 | 75 |
| POS09 | K09 | 143 | 64 |
| POS10 | K10 | 159 | 51 |
| POS11 | K11 | 175 | 45 |
| POS12 | K12 | 191 | 32 |
| POS13 | K13 | 207 | 29 |
| POS14 | K14 | 223 | 24 |
| POS15 | K15 | 239 | 21 |
| POS16 | K16 | 255 | 20 |

FIG.13

| PATCH | TONE VALUE | MEASURED DENSITY |
|---|---|---|
| K00 | 0 | 0.057 |
| K01 | 16 | 0.079 |
| K02 | 32 | 0.126 |
| K03 | 48 | 0.188 |
| K04 | 64 | 0.242 |
| K05 | 80 | 0.330 |
| K06 | 96 | 0.409 |
| K07 | 112 | 0.520 |
| K08 | 128 | 0.611 |
| K09 | 143 | 0.706 |
| K10 | 159 | 0.832 |
| K11 | 175 | 0.908 |
| K12 | 191 | 1.089 |
| K13 | 207 | 1.136 |
| K14 | 223 | 1.236 |
| K15 | 239 | 1.399 |
| K16 | 255 | 1.437 |

FIG.14

| TONE VALUE | TARGET DENSITY |
|---|---|
| 0 | 0.061 |
| 17 | 0.122 |
| 34 | 0.186 |
| 51 | 0.254 |
| 68 | 0.325 |
| 85 | 0.400 |
| 102 | 0.480 |
| 119 | 0.565 |
| 136 | 0.657 |
| 153 | 0.755 |
| 170 | 0.860 |
| 187 | 0.976 |
| 204 | 1.102 |
| 221 | 1.242 |
| 238 | 1.399 |
| 255 | 1.577 |

IMAGE PROCESSING APPARATUS

CROSS-REFERENCE TO RELATED APPLICATIONS

The present application claims priority to and incorporates by reference the entire contents of Japanese Patent Application No. 2010-125794 filed in Japan on Jun. 1, 2010 and Japanese Patent Application No. 2011-092411 filed in Japan on Apr. 18, 2011.

BACKGROUND OF THE INVENTION

1. Field of the Invention

The present invention relates to image processing apparatuses.

2. Description of the Related Art

There are some cases that printouts produced from a single image data item by an output unit provided in an image processing apparatus vary in densities due to a chronological change in characteristics specific to the output unit provided in the image processing apparatus. To reduce such chronological density variation, a technique of causing an image processing apparatus to output a tone-correction-parameter generation sheet has conventionally been employed. In this technique, the tone-correction-parameter generation sheet is read out to calculate a tone correction parameter for use in calibration of tone characteristics of the output unit.

Examples of a technique of reading out a tone-correction-parameter generation sheet by using a high-precision colorimeter or a flatbed scanner are disclosed in Japanese Patent Application Laid-open No. 2005-260305 and Japanese Patent No. 3241986.

In the technique disclosed in Japanese Patent Application Laid-open No. 2005-260305, a scanner profile that specifies a relationship between readout values obtained by a scanner by scanning a readout target placed on a platen and color measurement values of the readout target is created for each of positions on the platen. In this technique, scanner data obtained by scanning a patch printed by a printing unit at any one position of the positions on the platen is corrected by using a scanner profile for the one position. This configuration allows correcting a position-to-position readout error caused by the scanner.

In the technique Japanese Patent Application Laid-open No. 2005-260305, a plurality of standard color sheets is used to create the scanner profiles for each of the positions on the platen. More specifically, in this technique, a method (multiple-sheet method) of creating the scanner profiles by using, as the scan target, a plurality of different color sheets, each of which is a single-color sheet, is employed.

However, the multiple-sheet method is disadvantageous in that color measurements for all of the positions and for all of the plurality of sheets must have been conducted.

Furthermore, when the multiple-sheet method is employed, accuracy of a tone correction parameter may deteriorate by flare phenomenon. The flare phenomenon is a phenomenon that, even when density levels of target points are equal to each other, readout values of the target points obtained by a scanner may vary depending on images around the target points. More specifically, the multiple-sheet method is disadvantageous in that, in a situation where a layout of a sheet for use in creating scanner profiles differs from a layout of a sheet for use in creating tone correction parameters, as a result an accuracy of the generated tone correction parameter may deteriorate.

To prevent the deterioration in accuracy of the tone correction parameter caused by the flare phenomenon, the above-described two types of sheets are desirably identical in layout. However, the multiple-sheet method requires a plurality of sheets to be printed not only when creating scanner profiles but also when creating a tone correction parameter, and therefore a huge man-hour is required.

SUMMARY OF THE INVENTION

It is an object of the present invention to at least partially solve the problems in the conventional technology.

According to an aspect of the present invention, an image processing apparatus includes: an output unit that outputs a tone-correction-parameter generation sheet and a scanner-profile generation sheet, patch columns being formed on each of the tone-correction-parameter generation sheet and the scanner-profile generation sheet, each of the patch columns containing a plurality of patches of different tone values and arranged in a predetermined direction, the tone-correction-parameter generation sheet and the scanner-profile generation sheet being identical in layout of the patch columns; a read out unit that reads out the patches of any one of the tone-correction-parameter generation sheet and the scanner-profile generation sheet placed on a platen at each of positions on the platen; a scanner-profile creating unit that creates a scanner profile for each of the read out positions, the scanner profile specifying a relationship between readout values and first color measurement values, the readout values being obtained by reading out at least two patches of different tone values on the scanner-profile generation sheet at each of the positions on the platen, the first color measurement values being obtained by a colorimeter by measuring the at least two patches; a color-measurement-value deriving unit that obtains first color measurement values of the patches, based on readout values obtained by reading out the patches on the tone-correction-parameter generation sheet and the scanner profiles that corresponds to the positions on the platen when the patches on the tone-correction-parameter generation sheet are being read out; and a calculating unit that calculates a tone correction parameter for use in correcting differences between second color measurement values and the first color measurement values, the second color measurement values being target color measurement values for the patches on the tone-correction-parameter generation sheet.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 illustrates an example data structure of an actually measured density table;

FIG. 8 illustrates an exemplary data structure of a scanner table;

FIG. 11 is a flowchart illustrating a procedure for a tone-correction-parameter creation process;

FIG. 12 illustrates an exemplary calculation result of readout values of individual patches on the tone-correction-parameter generation sheet;

FIG. 13 illustrates an exemplary data structure of a conversion table;

FIG. 14 is a table of tone values of patches in a black patch column 20K indicated in second image data and target densities for the patches;

DETAILED DESCRIPTION OF THE PREFERRED EMBODIMENTS

Exemplary embodiments of the present invention will be described below.

First Embodiment

Figure 1:
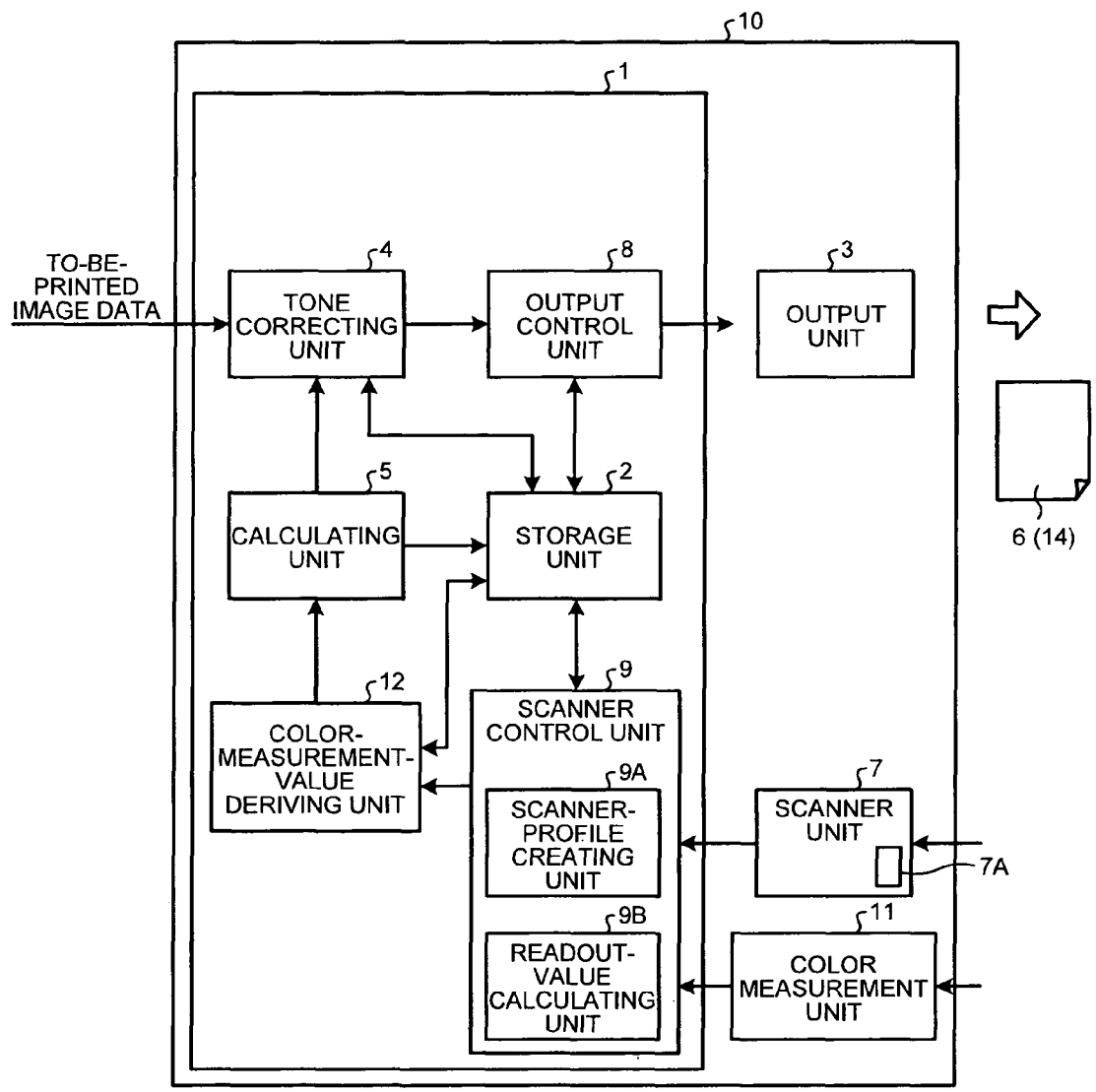
FIG. 1 is a schematic diagram illustrating the configuration of a printer according to a first embodiment of the present invention.

FIG. 1 is a schematic diagram illustrating the configuration of a printer (image processing apparatus) 10 according to a first embodiment of the present invention. The printer, which is an example of the image processing apparatus, may alternatively be a digital copier, a facsimile, or the like.

In FIG. 1, the printer (image processing apparatus) 10 includes a control unit 1, an output unit 3, a scanner unit 7 (readout unit), and a color measurement unit 11 (colorimeter).

The output unit 3 outputs an image that corresponds to the image data. In the first embodiment, the output unit 3 outputs a tone-correction-parameter generation sheet 6 and a scanner-profile generation sheet 14, which will be described later. An output unit of a known configuration, such as an electrophotographic output unit or an ink-jet output unit, may be used as the output unit 3.

The scanner unit 7 includes a platen 7A and reads out a various type of image formed on a readout target that is placed on the platen 7A. The scanner unit 7 may be, for instance, a scanner of a known configuration that reads out various types of images formed on a readout target by illuminating the readout target placed on the platen 7A with light and optically reading reflection light from the scan target. In the first embodiment, the scanner unit 7 reads out patches (to be described in detail later) formed on the tone-correction-parameter generation sheet 6 or patches (to be described in detail later) formed on the scanner-profile generation sheet 14 at positions (hereinafter, referred to as "scanner positions" in some cases) on the platen 7A.

The color measurement unit 11 obtains a colorimetric value of the various type of image. In the first embodiment, a case in which the color measurement unit 11 measures densities as the colorimetric value will be explained. In the first embodiment, the color measurement unit 11 measures densities of the individual patches on the tone-correction-parameter generation sheet 6 and the scanner-profile generation sheet 14. The color measurement unit 11 may be, for instance, a measuring device of a known configuration that measures densities with a high-accuracy. A result of density measurement made on each of the patches on the scanner-profile generation sheet 14 is referred to as a measured density (first color measurement value) below.

The tone-correction-parameter generation sheet 6 and the scanner-profile generation sheet 14 used by the printer 10 according to the first embodiment will be described below.

The tone-correction-parameter generation sheet 6 is such a sheet to be read out by the scanner unit 7 when a tone correction parameter is being generated. The scanner-profile generation sheet 14 is such a sheet to be read out by the scanner unit 7 and measured by the color measurement unit 11 for creation of a scanner profile. The scanner profile is such a file for correcting position-to-position variation on the platen 7A caused by the scanner unit 7. A tone correction parameter is such a parameter for correcting tone characteristics of the output unit 3.

Figure 2:
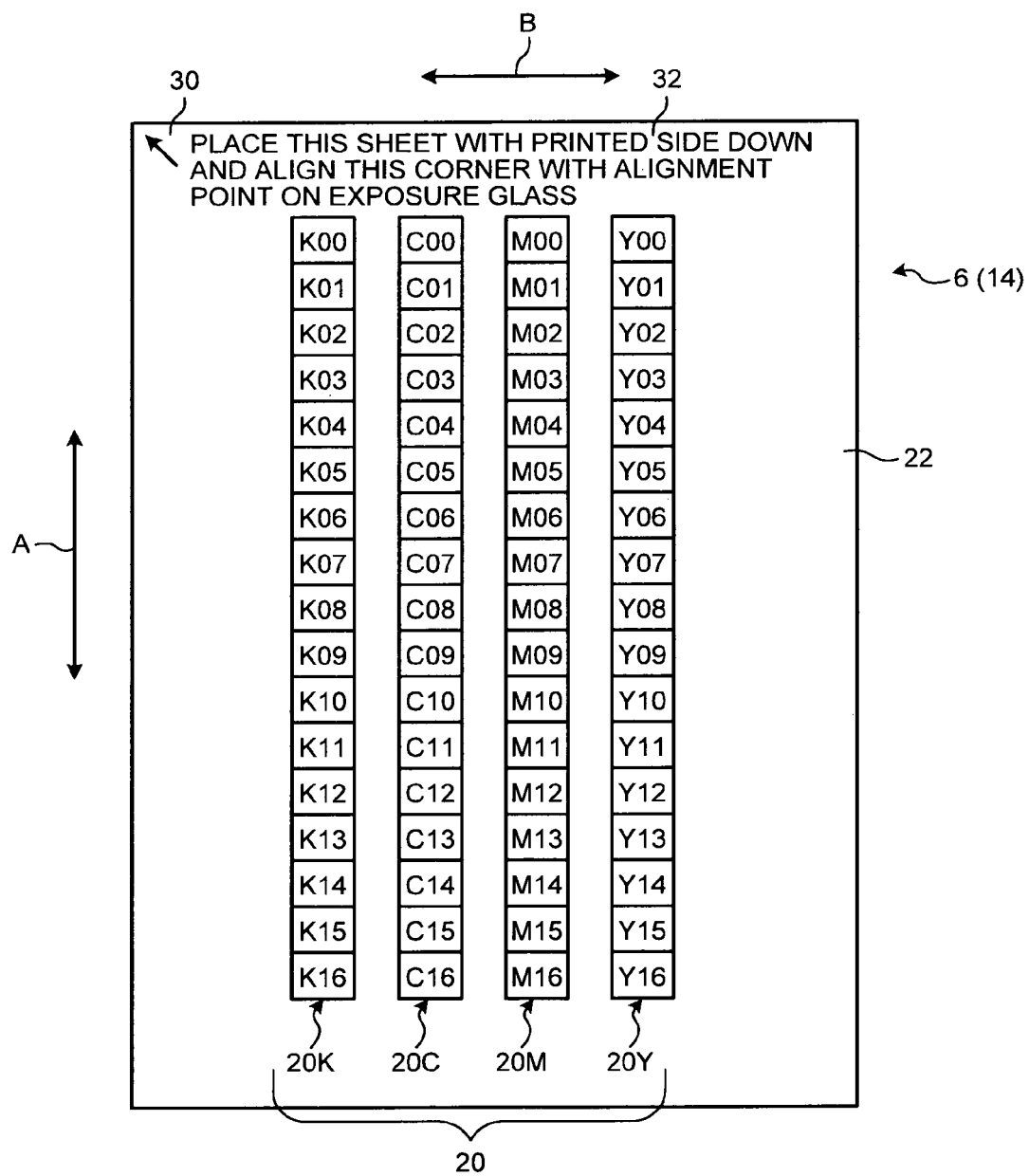
FIG. 2 is a schematic diagram illustrating a tone-correction-parameter generation sheet (and a scanner-profile generation sheet)

As illustrated in FIG. 2, the tone-correction-parameter generation sheet 6 is obtained by forming, on a recording medium 22, a plurality of images of patch columns 20 elongated in a predetermined direction (the direction indicated by arrow A (hereinafter, "arrow-A direction") in FIG. 2). The plurality of patch columns 20 are arranged side by side in a direction (in FIG. 2, the direction indicated by arrow B (hereinafter, "arrow-B direction")) orthogonal to the arrow-A direction. Meanwhile, the arrow-A direction of FIG. 2 is such a direction, along which one side of the rectangular recording medium 22 extends. The arrow-B direction of FIG. 2 is such a direction, along which the other side, orthogonal to the one side, of the recording medium 22 extends. A marker 30 and an explanatory note 32 for users are formed on the tone-correction-parameter generation sheet 6. The marker 30 (mark) indicates an alignment point for use in placing the tone-correction-parameter generation sheet 6 on the platen 7A of the scanner unit 7.

The plurality of patch columns 20 on the tone-correction-parameter generation sheet 6 are of different colors from one another. In the first embodiment, the patch columns 20 includes a black patch column 20K, a cyan patch column 20C, a magenta patch column 20M, and a yellow patch column 20Y that are elongated in the arrow-A direction of FIG. 2 and spaced in the arrow-B direction of FIG. 2. Each of black, cyan, magenta, and yellow is a color that can be expressed by the output unit 3 with only a single colorant (toner or ink).

In the first embodiment, an example where the patch columns 20 are spaced from one another in the arrow-B direction is discussed; alternatively, the patch columns 20 may be continuously arranged without spacing therebetween.

Each of the patch columns 20 is an image containing a plurality of patches of a same color but of different tone values arranged in the arrow-A direction. The patch column 20K is an image where from black patches K00 to K16 of different tone values are arranged from one end to the other end of the patch column 20K in the arrow-A direction. The patch column 20C is an image where from cyan patches C00 to C16 of different tone values are arranged from one end to the other end of the patch column 20C in the arrow-A direction. The patch column 20M is an image where from magenta patches M00 to M16 of different tone values are arranged from one end to the other end of the patch column 20M in the arrow-A direction. The patch column 20Y is an image where from yellow patches Y00 to Y16 of different tone values are arranged from one end to the other end of the patch column 20Y in the arrow-A direction. In other words, in each of the patch columns 20, the direction, along which the patches are arranged (the arrow-A direction), is parallel with a direction, along which tone values change. In the first embodiment, each of the patch columns 20 is an image containing 17 patches of a same color but of different tone values arranged in the arrow-A direction; however, the number of patches in each patch column is not limited to 17.

Figures 3, 4:
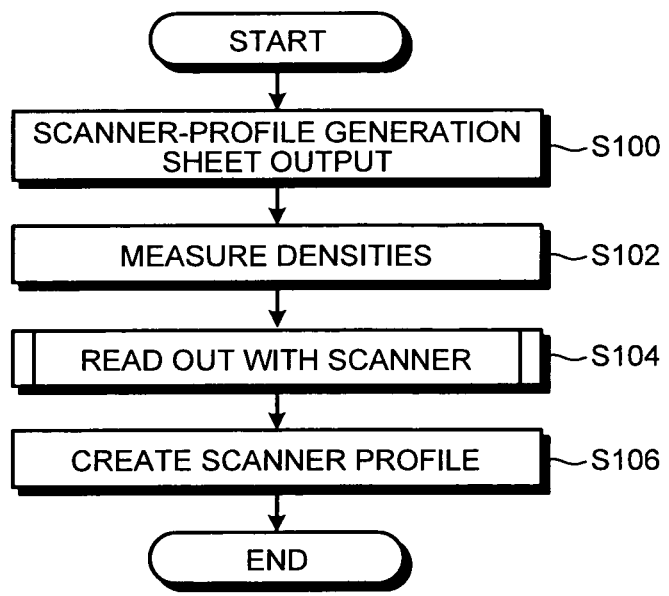
FIG. 3 is a table illustrating tone values of individual patches.
FIG. 4 is a flowchart illustrating a procedure for a scanner-profile creating process.

The tone values of the patches belonging to each of the patch columns 20 gradually increases or degreases from an end patch in the direction (the arrow-A direction), along which the patches are arranged, to the other end patch of the patch column 20. For instance, as illustrated in FIG. 3, tone values of the patches K00 to K16 of the patch column 20K are values increasing from 0 to 255 by an increment of 16. The direction (the arrow-A direction), along which the patches are arranged in each of the patch columns 20, may be referred to as a tone-changing direction in some cases below. Meanwhile, a tone value of a patch is such a tone value contained in image data, from which the patch is to be formed.

Meanwhile, differences between tone values of adjacent patches belonging to each of the patch columns 20 may be fixed or varied. For instance, one of the patch columns 20 may be configured such that as the tone value increases, difference between tone values of adjacent patches increases in the tone-changing direction.

In the first embodiment, the plurality of patches belonging to each of the patch columns 20 are arranged in the tone-changing direction without spacing therebetween; alternatively, the patches may be arranged with spacing therebetween in the tone-changing direction.

The scanner-profile generation sheet 14 and the tone-correction-parameter generation sheet 6 are identical in layout. "Identical in layout" means that the patch columns 20 formed on the recording medium 22 on the scanner-profile generation sheet 14 and those formed on the tone-correction-parameter generation sheet 6 are identical in position and configuration. Furthermore, "identical in configuration of the patch columns 20" means that each of the patch columns 20 (the patch columns 20K, 20C, 20M, and 20K) is identical in color, position, and size and that patches belonging to each of the patch columns 20 are identical in color, position, size, and tone color between the scanner-profile generation sheet 14 and the tone-correction-parameter generation sheet 6. So long as the patch columns 20 formed on the scanner-profile generation sheet 14 and those formed on the tone-correction-parameter generation sheet 6 are identical to each other, except for the patch columns 20 another image may be formed independently on the scanner-profile generation sheet 14 and the tone-correction-parameter generation sheet 6.

For instance, a mark for use in density measurement with a colorimeter may be formed outside or between the patch columns 20 on at least one of the scanner-profile generation sheet 14 and the tone-correction-parameter generation sheet 6.

Referring back to FIG. 1, the control unit 1 includes a central processing unit (CPU), read only memory (ROM), random access memory (RAM), and a bus connecting these units. The control unit 1 is electrically connected to the units in the printer 10.

To explain control unit 1 using functional blocks that is divided into each of the function implementation units that is determined based on hardware and software: in terms of the functional blocks, as illustrated in FIG. 1, the control unit 1 includes a storage unit 2, an output control unit 8, a scanner control unit 9, a color-measurement-value deriving unit 12, a calculating unit 5, and a tone correcting unit 4.

The storage unit 2 stores scanner profiles, tone correction parameters, and the like. The storage unit 2 also stores first image data, from which an image containing the patches is to be formed on the scanner-profile generation sheet 14, and second image data, from which an image containing the patches is to be formed on the tone-correction-parameter generation sheet 6.

As described above, the scanner-profile generation sheet 14 and the tone-correction-parameter generation sheet 6 are identical in layout. Accordingly, in the first embodiment, the image data portion that corresponds to the patch columns 20 in the first image data and the second image data are the same. The first image data is for forming each of the patches to be formed on the scanner-profile generation sheet 14; and second image data is for forming each of the patches to be formed on the on the tone-correction-parameter generation sheet 6.

More specifically, each of the image data portion of the first image data and the image data portion of the second image data corresponding to the patch columns 20 contains the tone values for each of the patch columns 20K, 20C, 20M, and 20K discussed below. The image data representing the patches in each of the patch columns 20 contains color data about corresponding one of black (K), cyan (C), magenta (M), and yellow (Y). The image data representing the patches in the patch column 20K contains tone values from 0 to 255 for black (K), whereas the image data contains tone values 0 for color data for cyan (C), magenta (M), and yellow (Y). Accordingly, the patches K00 to K16 in the patch column 20K are black patches of tone values from 0 to 255. Similarly, the image data representing the patches in the patch column 20M contains tone values from 0 to 255 for magenta (M), whereas the image data contains tone values 0 for color data for black (K), cyan (C), and yellow (Y). The image data representing the patches in the patch column 20C contains tone values from 0 to 255 for cyan (C), whereas the image data contains tone values 0 for color data for black (K), magenta (M), and yellow (Y). The image data representing the patches in the patch column 20Y contains tone values from 0 to 255 for yellow (Y), whereas the image data contains tone values 0 for color data for cyan (C), magenta (M), and black (K).

The tone correcting unit 4 performs tone correction on print image data or the like inputted from a personal computer (PC) or the like by applying a tone correction parameter thereto. The tone correcting unit 4 may also perform tone correction on the first image data and the second image data.

The output control unit 8 controls the output unit 3. In the first embodiment, the output control unit 8 outputs the second image data having undergone tone correction performed by the tone correcting unit 4 to the output unit 3. Upon receiving the second image data, the output unit 3 forms an image corresponding to the second image data on the recording medium 22. As a result, the output unit 3 outputs the tone-correction-parameter generation sheet 6 (see FIG. 2). The output control unit 8 also outputs the first image data having undergone tone correction performed by the tone correcting unit 4 to the output unit 3. Upon receiving the first image data, the output unit 3 forms an image corresponding to the first image data on the recording medium 22. As a result, the output unit 3 prints out the scanner-profile generation sheet 14 (see FIG. 2). The output control unit 8 also outputs the print image data having undergone tone correction performed by the tone correcting unit 4 to the output unit 3. The output unit 3 forms an image corresponding to the print image data on the recording medium 22.

The scanner control unit 9 controls the scanner unit 7 and the color measurement unit 11. The scanner control unit 9 receives image data from the scanner unit 7. In the first embodiment, the scanner control unit 9 obtains readout image data which is a result of the readout of the scanner-profile generation sheet 14 or the tone-correction-parameter generation sheet 6 by the scanner unit 7. The scanner control unit 9 also calculates readout values of the patches on the scanner-profile generation sheet 14 or the tone-correction-parameter generation sheet 6 based on the obtained readout image data (to be described in detail later).

The scanner control unit 9 also receives measured densities of each of the patches from the color measurement unit 11.

The scanner control unit 9 includes a scanner-profile creating unit 9A and a readout value calculating unit 9B.

The scanner-profile creating unit 9A creates scanner profiles. More specifically, in the first embodiment, the scanner-profile creating unit 9A creates, for each of the scanner positions on the platen 7A, a scanner profile that specifies a relationship between readout values obtained by the scanner unit 7 by scanning two or more patches of different tone values on the scanner-profile generation sheet 14 at each of the scanner positions and measured densities of the patches obtained by the color measurement unit 11. The scanner-profile creating unit 9A stores the scanner profiles in the storage unit 2.

The readout value calculating unit 9B calculates readout values of the individual patches on the scanner-profile generation sheet 14 based on the scanned image data received from the scanner unit 7.

The color-measurement-value deriving unit 12 obtains a measured density that corresponds to each of the patches based on: the readout value obtained by reading out the patch of the tone-correction-parameter generation sheet 6; and a scanner profile that corresponds to the position on the platen 7A when each of the patches is being read out.

The calculating unit 5 calculates a tone correction parameter for correcting tone characteristics of the output unit 3. The tone correction parameter is, put another way, a parameter for correcting differences between desired tone values and densities (hereinafter, "target densities") (second color measurement values) of the individual patches formed on the tone-correction-parameter generation sheet 6 and the measured densities of the individual patches obtained by the color-measurement-value deriving unit 12.

A procedure for a scanner-profile creating process to be performed in the printer 10 according to the first embodiment will be described below. FIG. 4 is a flowchart illustrating the procedure for the scanner-profile creating process to be performed in the printer 10 according to the first embodiment.

A tone value of the image data, which is used when the output unit 3 outputs the image, is indicated by integral numbers from 0 to 255. The greater the tone value, the higher the density. In contrast, the smaller a readout value of scanner data or a readout value obtained by the scanner unit 7, the greater the density.

The output control unit 8 causes the output unit 3 to output the scanner-profile generation sheet 14 (Step S100). More specifically, the output control unit 8 retrieves the first image data from the storage unit 2 and outputs the first image data to the output unit 3. Alternatively, the output control unit 8 may output the first image data having undergone tone correction performed by the tone correcting unit 4 to the output unit 3. Upon receiving the first image data, the output unit 3 forms an image of the first image data on the recording medium 22. Hence, the output unit 3 outputs the scanner-profile generation sheet 14 (see FIG. 2).

Subsequently, the color measurement unit 11 measures measured density, which is density of each of the patches, on the scanner-profile generation sheet 14 (Step S102). The color measurement unit 11 outputs the measured densities of the individual patches and information indicative of the corresponding patches to the scanner control unit 9. The scanner control unit 9 stores a measured density table, in which the measured densities of the individual patches and the information indicative of the corresponding patches received from the color measurement unit 11 are associated with the tone values of the individual patches, in the storage unit 2. Tone values of the individual patches are obtained from tone values assigned to the individual patches in the second image data.

FIG. 5 illustrates an example data structure of the measured density table. Measured densities of the patches K00 to K16 of the patch column 20K are indicated in FIG. 5.

Subsequently, the scanner unit 7 reads out the individual patches on the scanner-profile generation sheet 14 at each of the scanner positions on the platen 7A (Step S104). BY the process performed at Step S104, the scanner control unit 9 obtains readout values of two or more patches of different tone values on the scanner-profile generation sheet 14 at each of the positions on the platen 7A. In the first embodiment, an example where the scanner control unit 9 obtains readout values of three patches of different tone values on the scanner-profile generation sheet 14 at each of the scanner positions on the platen 7A will be described below. More specifically, in the first embodiment, the scanner control unit 9 obtains, at each of the scanner positions on the platen 7A, readout values of three patches that are of different tone values and consecutively arranged in the tone-changing direction on the patch columns 20 on the scanner-profile generation sheet 14.

More specifically, a user places on the platen 7A the scanner-profile generation sheet 14 such that a side, where the patch columns 20 and the like are formed, of the scanner-profile generation sheet 14 faces the platen 7A.

Figure 6:
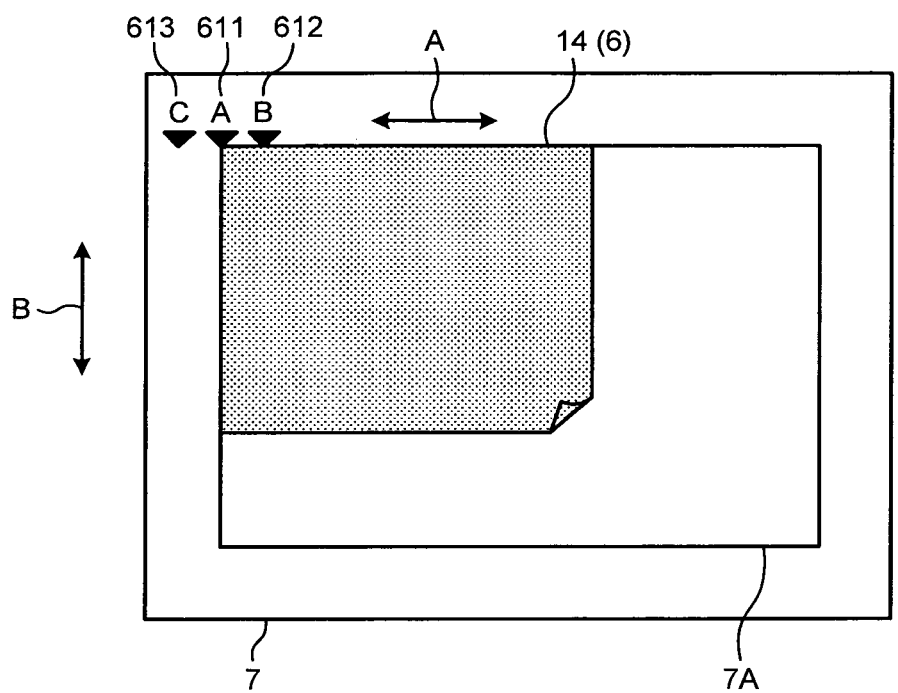
FIG. 6 is a schematic diagram illustrating a state where any one of the tone-correction-parameter generation sheet and the scanner-profile generation sheet is placed on a platen.

Reference position markers (marks) C613, A611, and B612 (mark) for use in position alignment of the scanner-profile generation sheet 14 or the tone-correction-parameter generation sheet 6 are provided on the platen 7A (see FIG. 6). These reference position markers C613, A611, and B612 are arranged in the tone-changing direction, along which the patches of each of the patch columns 20 are arranged on the scanner-profile generation sheet 14 or the tone-correction-parameter generation sheet 6 that is placed on the platen 7A. The distance between the adjacent reference position markers C613, A611, and B612 is equal to the length, in the tone-changing direction, of a single patch in the patch columns 20.

The user then adjusts the position of the scanner-profile generation sheet 14 so that an end, indicated by the marker 30, of the scanner-profile generation sheet 14 coincides with the reference position marker A611 provided on the platen 7A. Simultaneously, the user also adjusts orientation of the scanner-profile generation sheet 14 so that the tone-changing direction (the arrow-A direction of FIG. 2) of the patches on the scanner-profile generation sheet 14 is parallel with the direction, along which the reference position markers C613, A611, and B612 on the platen 7A are arranged.

The scanner unit 7 reads out the scanner-profile generation sheet 14 in this state. The readout value calculating unit 9B receives the readout image data from the scanner unit 7 and calculates readout values of the individual patches on the scanner-profile generation sheet 14 based on the readout image data.

Figure 7:
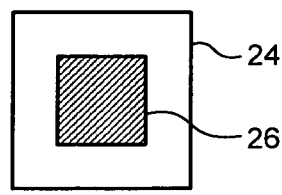
FIG. 7 is a schematic diagram illustrating calculation of a readout value of a patch.

More specifically, the readout value calculating unit 9B calculates, for each patch in the readout image data obtained by the scanner unit 7 by reading out the patch columns 20 (20K, 20C, 20M, and 20Y), an average of an area of 128×128 pixels (an area 26 illustrated in FIG. 7) in an area where the patch is formed (an area 24 illustrated in FIG. 7) as a readout value of the patch. The readout value calculating unit 9B calculates a readout value of each of black patches and yellow patches from green channel data. The readout value calculating unit 9B calculates a readout value of each of cyan patches from red channel data fed from the scanner unit 7. The readout value calculating unit 9B calculates a readout value of each of magenta patches from blue channel data fed from the scanner unit 7. A channel where a range of tone values in the image data fed from the scanner unit 7 is relatively wide is desirably selected for each color of the patches.

The scanner control unit 9 stores, in advance, information indicative of the scanner positions, at which the individual patches on each of the patch columns 20 are located when the scanner-profile generation sheet 14 is placed on the platen 7A with reference to the reference position marker A611, associated with information indicative of the individual patches. Hence, the scanner control unit 9 has the readout values of the individual patches on the scanner-profile generation sheet 14 and the information indicative of the scanner positions, at which the individual patches have been scanned on the platen 7A.

In a way as described above, the scanner control unit 9 obtains the readout values of the individual patches on the scanner-profile generation sheet 14 placed on the platen 7A with reference to the reference position marker A611.

The scanner control unit 9 stores the obtained readout values of the individual patches, together with the information indicative of the patches and the tone values of the patches, in a form of being associated with the information indicative of the scanner positions, at which the individual patches have been scanned on the platen 7A, in the storage unit 2. Meanwhile, the tone values of the patches are information indicative of the tone values of the patches contained in the first image data.

Similarly, the scanner unit 7 scans the scanner-profile generation sheet 14 placed on the platen 7A with reference to the reference position marker C613 and the reference position marker B612, respectively, and obtains readout values of the individual patches. In the first embodiment, a user changes a load position of the scanner-profile generation sheet 14 on the platen 7A in the tone-changing direction (the arrow-A direction) of the patches in the patch columns 20. More specifically, in the first embodiment, the user changes the reference marker to each of the other ones of the reference position markers (C613, A611, and B612) and aligns the scanner-profile generation sheet 14 to the reference markers.

Thus, the scanner unit 7 reads out three patches of a same color but of different tone values at a single position on the platen 7A. In the first embodiment, the scanner control unit 9 obtains readout values of three patches; or, more specifically, the scanner control unit 9 obtains readout values of a first patch that is read out at first and two other patches that are adjacent to the first patch in the tone-changing direction, read out at the single position on the platen 7A.

The scanner control unit 9 stores the thus-obtained readout values of the individual patches on the scanner-profile generation sheet 14 obtained while changing the load position of the scanner-profile generation sheet 14, together with the information indicative of the patches and the tone values of the patches, in the form of being associated with the information indicative of the scanner positions, at which the individual patches have been read out on the platen 7A, in the storage unit 2.

Thus, a scanner table, in which, for each of the scanner positions on the platen 7A, the readout values of the two or more patches on the scanner-profile generation sheet 14 read out at the single scanner position and of different tone values are associated with the information indicative of the individual patches and the information indicative of the tone values of the individual patches, is stored in the storage unit 2.

FIG. 8 illustrates an example of data structure of the scanner table. Readout values of the patches K00 to K16 of the patch column 20K are illustrated in FIG. 8. As illustrated in FIG. 8, the scanner table contains information indicative of the patches, tone values of the patches, and readout values of the patches associated with the scanner positions, at which the individual patches have been read out, for each of the reference-position-marks (C613, A611, and B612).

In FIG. 8, scanner positions from POS00 to POS16 are such positions where the patches K00 to K16 are located on the platen 7A in a situation where the scanner-profile generation sheet 14 is aligned to the reference position marker A611 on the platen 7A. For instance, as for the scanner position POS11, when the scanner-profile generation sheet 14 is aligned to the reference position marker A611, the patch K11 is read out at POS11; when the same is aligned to the reference position marker B612, the patch K10 is read out at POS11; when the same is aligned to the position marker C613, the patch K12 is read out at POS11.

As for the scanner position POS16, when the scanner-profile generation sheet 14 is aligned to the reference position marker A611, the patch K16 is read out at POS16; when the same is aligned to the reference position marker B612, the patch K15 is read out at POS16; when the same is aligned to the position marker C613, outside the patch column 20K is to be read out at POS16.

Thus, the scanner control unit 9 obtains the readout values of three patches of different tone values on the scanner-profile generation sheet 14 at each of the scanner positions on the platen 7A.

Referring back to FIG. 4, the scanner-profile creating unit 9A creates a scanner profile based on the measured density table and the scanner table (Step S106). More specifically, the scanner-profile creating unit 9A creates a scanner profile specifying a relationship between the readout values obtained by the scanner unit 7 by reading out two or more patches of different tone values on the scanner-profile generation sheet 14 at each of the scanner positions on the platen 7A and the measured densities of the patches obtained by the color measurement unit 11 for each of the positions (scanner positions).

How to determine a relationship (scanner profile) between the readout values and the measured densities at the scanner position POS11 from the measured density table in FIG. 5 and the scanner table in FIG. 8 will be described below.

As illustrated in FIG. 8, the scanner profile contains the readout values obtained by reading out the patches K11, K10, and K12 at the scanner position POS11. As illustrated in FIG. 5, the measured density table contains measured densities of the patches K11, K10, and K12. From these tables, it is read that the measured density and the readout value of the patch K11 is 0.927 and 44, respectively; the measured density and the readout value of the patch K11 is 0.832 and 49, respectively, and the measured density and the readout value of the patch K12 is 1.042 and 31, respectively.

Figure 9:
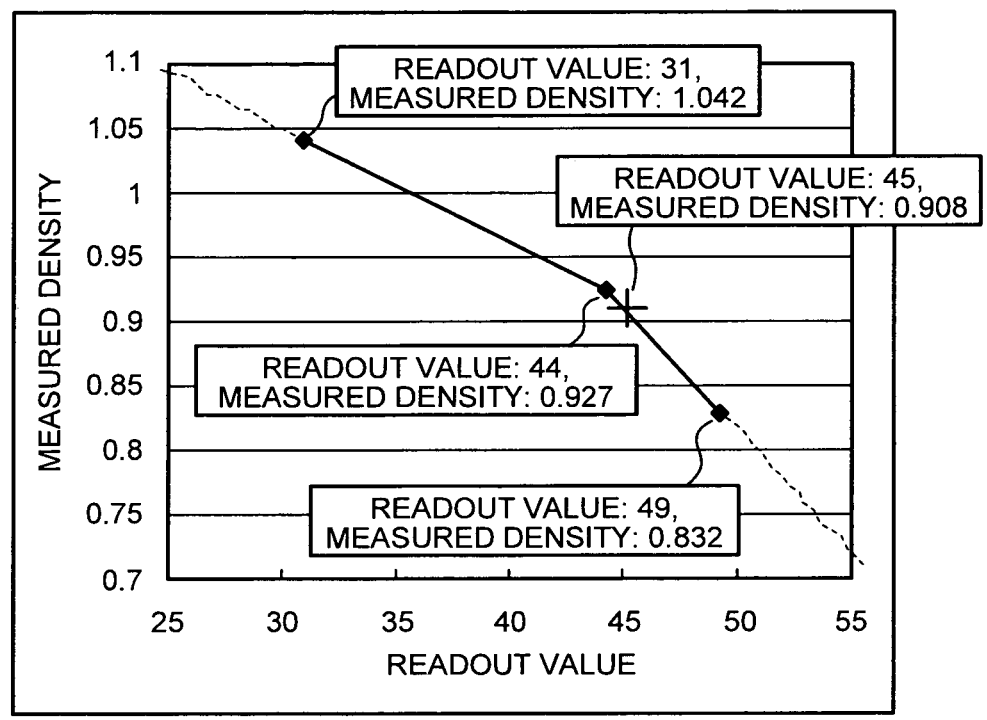
FIG. 9 is a schematic diagram illustrating a scanner profile that corresponds to a scan position POS11.

The scanner-profile creating unit 9A associates a measured-density with the readout value by applying linear interpolation to the measured densities and the readout values of these three points as illustrated in FIG. 9. The scanner-profile creating unit 9A creates a scanner profile for the scanner position POS11 in this way.

Meanwhile, when a readout value is out of the range of the three points, the scanner-profile creating unit 9A associates the measured-density with the readout value by extrapolation. More specifically, when a readout value is greater than 49, which is the readout value of the patch K10, the scanner-profile creating unit 9A associates the measured-density with the readout value by using a slope calculated from the measured densities and the readout values of the patches K10 and K11. Similarly, when a readout value is smaller than 31, which is the readout value of the patch K12, the scanner-profile creating unit 9A associates the measured-density with the readout value relationship by using a slope obtained from the measured densities and the readout values of the patches K12 and K11.

Figure 10:
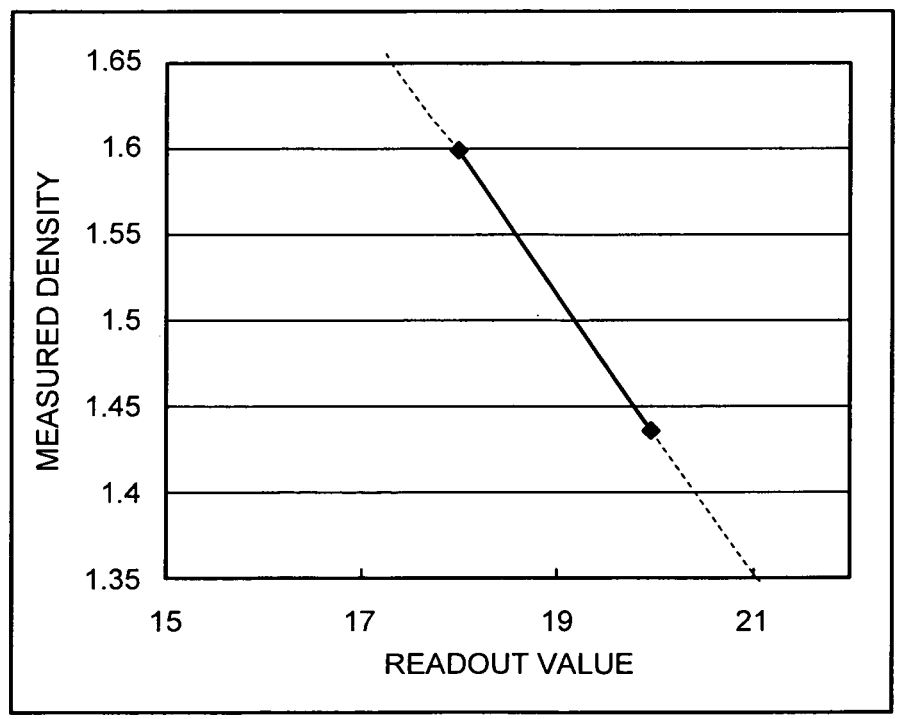
FIG. 10 is a schematic diagram illustrating a scanner profile that corresponds to a scan position POS16.

As illustrated in FIG. 8, the scanner table contains readout values obtained by scanning the patches K16 and K15 at the scanner position POS16. As illustrated in FIG. 5, the measured density table contains measured densities of the patches K16 and K15. The scanner-profile creating unit 9A associates a measured-density with readout value by applying linear interpolation to the measured densities and the readout values of these two points as illustrated in FIG. 10. Meanwhile, when a readout value is out of the range of the two points, the scanner-profile creating unit 9A associates a measured-density with readout value by extrapolation. The scanner-profile creating unit 9A thus creates a scanner profile that corresponds to the scanner position POS16.

In this way, the scanner-profile creating unit 9A associates the readout values obtained by the scanner 7 with the measured densities measured by the color measurement unit 11 for each of the scanner-position, thereby creating a scanner profile for each of the scanner positions.

A procedure for a tone-correction-parameter creation process to be performed by the printer 10 according to the first embodiment will be described below. FIG. 11 is a flowchart illustrating the procedure for the tone-correction-parameter creation process to be performed in the printer 10 according to the first embodiment.

The output control unit 8 causes the output unit 3 to print out the tone-correction-parameter generation sheet 6 (Step S201). More specifically, the output control unit 8 retrieves the second image data from the storage unit 2 and outputs the second image data to the output unit 3. Alternatively, the output control unit 8 may output the second image data having undergone tone correction performed by the tone correcting unit 4 to the output unit 3. Upon receiving the second image data, the output unit 3 forms an image of the second image data on the recording medium 22. Thus, the output unit 3 prints out the tone-correction-parameter generation sheet 6 (see FIG. 2).

Subsequently, the scanner unit 7 reads out the patches on each of the patch columns 20 on the tone-correction-parameter generation sheet 6 outputted at Step S201 (Step S202). The scanner unit 7 outputs the read out image data obtained from the tone-correction-parameter generation sheet 6 to the scanner control unit 9. The readout value calculating unit 9B of the scanner control unit 9 receives the scanned image data and calculates readout values of the individual patches on the tone-correction-parameter generation sheet 6 in a similar manner as Step S104 discussed above.

Meanwhile, to perform processing pertaining to Step S202, a user places on the platen 7A the tone-correction-parameter generation sheet 6 such that a side, where the patch columns 20 and the like are formed, of the tone-correction-parameter generation sheet 6 faces the platen 7A. The user then adjusts the position of the tone-correction-parameter generation sheet 6 so that an end, indicated by the marker 30, of the tone-correction-parameter generation sheet 6 coincides with the reference position marker A611 provided on the platen 7A. Simultaneously, the user also adjusts orientation of the tone-correction-parameter generation sheet 6 so that the direction of the patches on the tone-correction-parameter generation sheet 6 are arranged (the arrow-A direction of FIG. 2), is parallel with the direction, along which the reference position markers C613, A611, and B612 on the platen 7A are arranged.

The scanner unit 7 reads out the tone-correction-parameter generation sheet 6 in this state. The scanner control unit 9 calculates readout values of the individual patches on the tone-correction-parameter generation sheet 6 based on the scanned image data received from the scanner unit 7.

FIG. 12 illustrates an exemplary result of calculation of the readout values of the individual patches. Readout values of the patches K00 to K16 of the patch column 20K are described in FIG. 12.

The color-measurement-value deriving unit 12 obtains measured densities of the individual patches on the tone-correction-parameter generation sheet 6 based on: the readout values obtained by the scanner unit 7 by reading out the individual patches; and the scanner profiles that correspond to the scanner positions on the platen 7A when the patches are being read out (Step S203). More specifically, the color-measurement-value deriving unit 12 converts each of the readout values of the individual patches on the tone-correction-parameter generation sheet 6 into a measured value based on the scanner profiles that correspond to the positions on the platen 7A when the patches are being read out.

A specific example where the scanner unit 7 converts a readout value of the patch K11 (tone value: 175) into a measured value will be described below.

At Step S202, the patch K11 on the tone-correction-parameter generation sheet 6 is read out at the scanner position POS11 (see FIGS. 8 and 12). Accordingly, the color-measurement-value deriving unit 12 obtains the measured density that corresponds to the readout value of the patch K11 based on the scanner profile (see FIG. 9) that corresponds to the scanner position POS11. For instance, the readout value of the patch K11 on the scanner-profile generation sheet 14 is 45 (see FIG. 12). Thus, the color-measurement-value deriving unit 12 obtains 0.908 as the measured density of the patch K11 at the scanner position POS11 from the following equation:

$$0.927+(45-44)\times(0.832-0.927)\div(49-44)=0.908.$$

The color-measurement-value deriving unit 12 stores a conversion table, in which information indicative of the individual patches on the tone-correction-parameter generation sheet 6, the tone values of the individual patches, and the measured densities of the individual patches are associated with one another, in the storage unit 2.

FIG. 13 illustrates an exemplary data structure of the conversion table. The patches K00 to K16 in the patch column 20K on the tone-correction-parameter generation sheet 6 are described in FIG. 13.

Referring back to FIG. 11, the calculating unit 5 calculates a tone correction parameter based on the conversion table (Step S204). The calculating unit 5 calculates the tone correction parameter for correcting the difference between the target densities that should be outputted at individual patches of the tone-correction-parameter generation sheet 6 and the measured densities of the individual patches.

Calculating the tone correction parameter will be concretely described below with reference to FIGS. 13 and 14.

Tone values and target densities, provided in the second image data, of the individual patches K00 to K16 in the black patch column 20K are described in FIG. 14. According to the conversion table in FIG. 13, when a tone value of a certain patch in the second image data is 187, a patch whose target density is 0.976 is to be formed. The calculating unit 5 calculates, as the tone correction parameter, a gamma correction table that provides such density characteristics as discussed above.

For instance, according to the conversion table in FIG. 13, a measured value that corresponds to the patch K11 or a tone value of 175 is 0.908; a measured value that corresponds to the patch K12 or a tone value of 191 is 1.089. Therefore a corrected tone value for outputting a patch for a tone value of 187 at the target density of 0.976 is obtained by linear interpolation.

Figure 15:
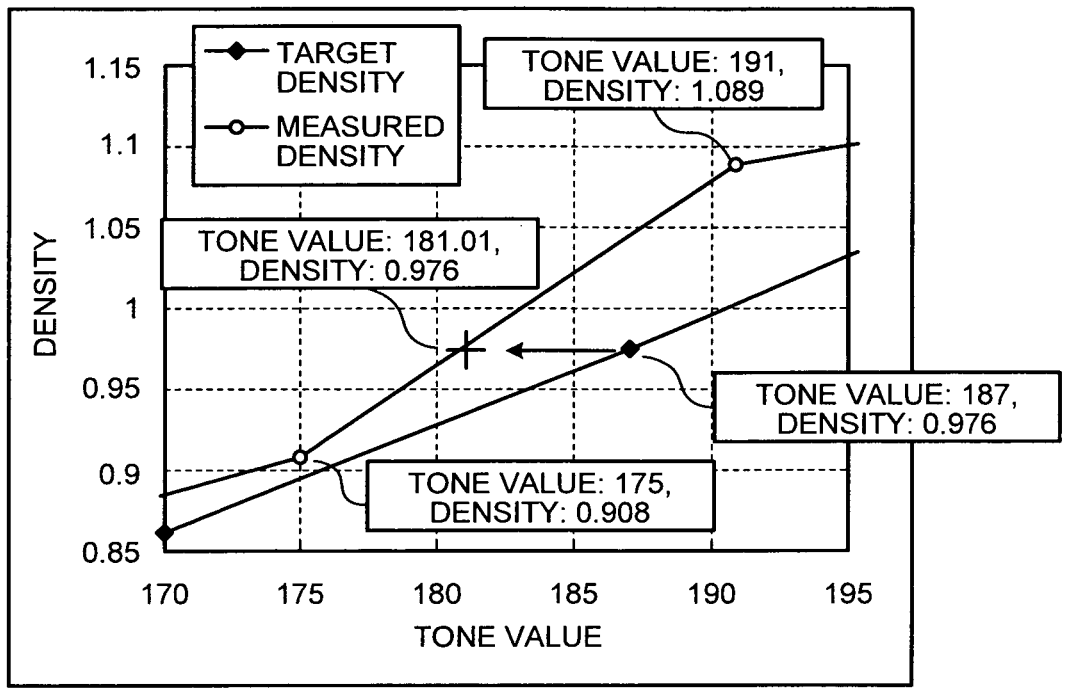
FIG. 15 is a schematic diagram illustrating an example of a tone correction parameter.

In this example, (0.976−0.908)×(191−175)÷(1.089−0.908)+175÷181 is obtained. Thus, 181, which is a rounded-off value of 181.01, may be obtained as the corrected tone value. The calculating unit 5 calculates a gamma correction table as the tone correction parameter. The gamma correction table outputs a corrected tone value of 181 when an image data of tone value of 187 is inputted (see FIG. 15).

The calculating unit 5 creates a gamma correction table for discrete 16 points by similarly performing calculations for the other tone values described in FIG. 14. The calculating unit 5 then adjusts these 16 points by using spline interpolation so as to make a gamma correction curve smooth and prevent inversion as required. Furthermore, the calculating unit 5 calculates a gamma correction table as the tone correction parameter, where, in the gamma correction table, a corrected tone value that corresponds to each of tone values from 0 to 255 in 1-tone-value increments is set.

The calculating unit 5 similarly calculates a tone correction parameter (a gamma correction table) for also each of cyan, magenta, and yellow.

The calculating unit 5 then stores the calculated tone correction parameters in the storage unit 2. The calculating unit 5 also configures settings for the tone correcting unit 4 such that the tone correcting unit 4 performs tone correction by using the tone correction parameters (gamma correction tables) (Step S206).

Figure 16:
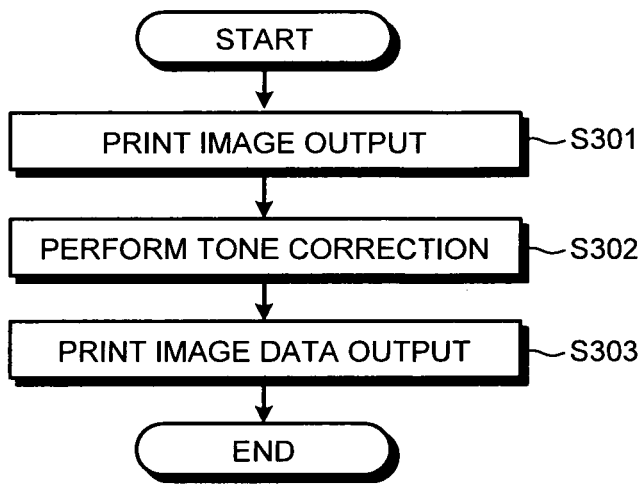
FIG. 16 is a flowchart illustrating a procedure for print image data output process.

A procedure of an output process of the print image data in the control unit 1 will be described below. FIG. 16 is a flowchart illustrating the procedure of the print image data output process to be performed in the printer 10 according to the first embodiment.

First, the control unit 1 receives print image data from an external PC or the like (step S301). The print image data contains a plurality of data items each representing a pixel. Each data item presenting a pixel contains data indicating a tone value from 0 to 255. The tone correcting unit 4 receives the data items representing the pixels contained in the print image data in a one-pixel-at-a-time manner.

Subsequently, the tone correcting unit 4 corrects tone values of the data items that individually represent the pixels in the received print image data (Step S302). More specifically, the tone correcting unit 4 obtains, for each of the pixels, a corrected tone value corresponding to a tone value indicating the tone value of the data item representing the pixel based on the tone correction parameters (gamma correction tables) stored in the storage unit 2. In this way, the tone correcting unit 4 corrects tone correction values by converting the tone values of the data items representing the pixels in the print image data into corrected tone values provided in the tone correction parameters (gamma correction tables).

The output control unit 8 outputs the print image data having undergone tone correction performed by the tone correcting unit 4 to the output unit 3 (Step S303). The output unit 3 forms an image, which corresponds to the received print image data, on the recording medium 22.

As described above, in the printer 10 according to the first embodiment, the tone-correction-parameter generation sheet 6 and the scanner-profile generation sheet 14 are configured to be identical in layout. Each of the tone-correction-parameter generation sheet 6 and the scanner-profile generation sheet 14 has the patch columns 20 on which a plurality of patches of different tone values are arranged in a predetermined direction. The scanner-profile creating unit 9A creates, for each of the scanner positions on the platen, a scanner profile specifying a relationship between readout values obtained by reading out two or more patches of different tone values on the scanner-profile generation sheet 14 at each of the scanner positions and the measured densities of the patches measured by the color measurement unit 11. The color-measurement-value deriving unit 12 obtains measured densities of the individual patches on the scanner-profile generation sheet 14 based on the readout values obtained by the scanner unit 7 by reading out the patches and scanner profiles that corresponds to reading out positions on the platen 7A when the patches is being read out. The calculating unit 5 calculates tone correction parameters for use in correcting differences between target densities for the individual patches on the tone-correction-parameter generation sheet 16 and the measured densities of the individual patches. When an image is being formed, the printer 10 prints out an image of the print image data having undergone tone correction performed by using the tone correction parameter.

As discussed above, the printer 10 according to the first embodiment creates a scanner profile for each of scanner positions based on readout values obtained by the scanner unit 7 by scanning at least two patches of different tone values on the tone-correction-parameter generation sheet 6 at a single scanner position on the platen 7A. As a result, it becomes possible to obtain input characteristics that are appropriate for output characteristics correction to be defined accurately and easily by using a relatively small number of printout sheets, which leads to creation of an accurate tone correction parameter.

In the first embodiment, a case is explained in which the scanner control unit 9 (the readout value calculating unit 9B) obtains readout values of three patches read out at a single position on the platen 7A, or, more specifically, a first patch that is read out first and two other patches that are adjacent to the first patch in the tone-changing direction, for creation of a scanner profile. However, the number of patches to be read out for creation of a scanner profile is not limited to three; the scanner control unit 9 may create a scanner profile based on readout values of at least two patches of different tone values on the tone-correction-parameter generation sheet 6.

In the first embodiment, the scanner control unit 9 obtains readout values of three patches read out at a single position on the platen 7A, or, more specifically, a first patch read out first and two other patches that are adjacent to the first patch in the tone-changing direction. However, the patches to be read out for creation of a scanner profile is not limited to such patches that are adjacent to one another in the tone changing direction; the scanner control unit 9 may create a scanner profile based on readout values of any two or more patches of different tone values on the tone-correction-parameter generation sheet 6. For instance, alternatively, the scanner control unit 9 (the readout value calculating unit 9B) may obtain readout values of a first patch scanned first and one or two other patches, which are scanned at the same position as the first patch on the platen 7A, that are apart from the first patch in the tone-changing direction with N (N is an integer equal to or greater than one) patches therebetween for creation of a scanner profile.

Second Embodiment

A second embodiment of the present embodiment will be described below with reference to FIG. 17. Repeated descriptions about elements and the like similar to those of the first embodiment are omitted below.

In the second embodiment, a scanner-profile generation sheet 14A is used in lieu of the scanner-profile generation sheet 14 that is used in the first embodiment.

Figure 17:
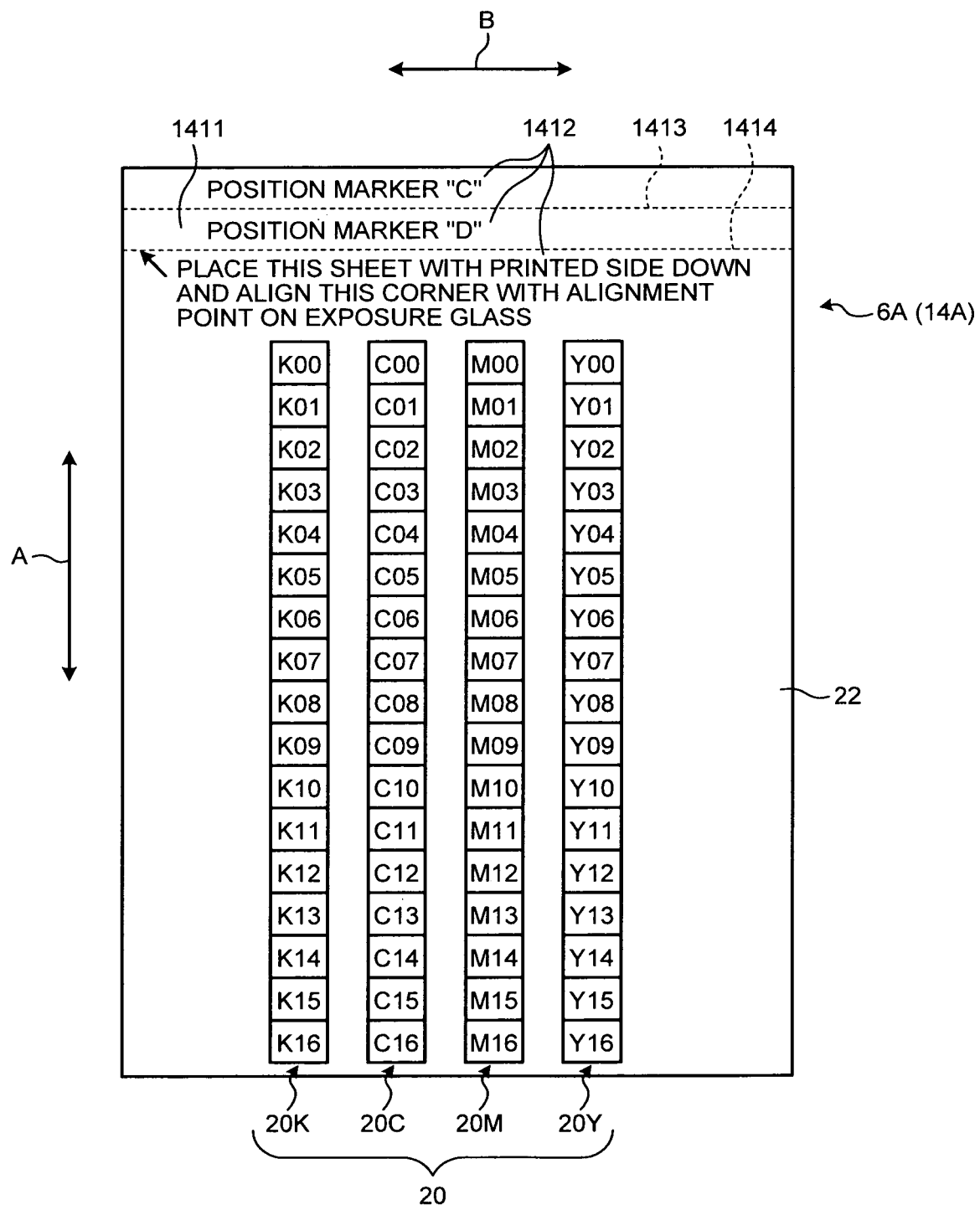
FIG. 17 is a schematic diagram illustrating a tone-correction-parameter generation sheet and a scanner-profile generation sheet according to a second embodiment of the present invention.

As is the scanner-profile generation sheet 14, the scanner-profile generation sheet 14A is such a sheet obtained by forming, on the recording medium 22, a plurality of images of patch columns 20 elongated in a predetermined direction (in FIGS. 2 and 17, the arrow-A direction). The plurality of patch columns 20 are arranged side by side in a direction (in FIGS. 2 and 17, the arrow-B direction) orthogonal to the arrow-A direction. Meanwhile, the arrow-A direction of FIG. 17 is such a direction, along which one side of the rectangular recording medium 22 extends. The arrow-B direction of FIG. 17 is such a direction, along which the other side orthogonal to the one side of the recording medium 22 extends.

On the scanner-profile generation sheet 14A, a marker 1411, a position marker C1413, a position marker D 1414, and an explanatory note 1412 for users are formed on the scanner-profile generation sheet 14A in lieu of the marker 30 and the explanatory note 32, which are formed on the scanner-profile generation sheet 14. The marker 1411, the position marker C1413, the position marker D1414, and the explanatory note 1412 for users are provided on an end portion in the direction (the arrow-A direction), along which the patch columns 20 extend, of the rectangular scanner-profile generation sheet 14A. More specifically, the marker 1411, the position marker C1413, the position marker D1414, and the explanatory note 1412 for users are provided outside an area where the patch columns 20 are formed on the rectangular scanner-profile generation sheet 14A.

Hence, the scanner-profile generation sheet 14 and the scanner-profile generation sheet 14 are identical in layout of the patch columns 20 but different from each other in images other than the patch columns 20.

In the second embodiment, as in the first embodiment, the scanner-profile generation sheet 14A is identical in layout with a tone-correction-parameter generation sheet 6A. Meanwhile, "identical in layout" means the same as that in the first embodiment, and repeated description is omitted.

Each of the position marker C1413 and the position marker D1414 is a linear image elongated in the direction (the arrow-B direction of FIG. 17), along which the patch columns 20 are arranged on the scanner-profile generation sheet 14A. Both of a distance between one side, which is parallel to the position marker C1413 and closest thereto, of the scanner-profile generation sheet 14A and the position marker C1413 and a distance between the position marker C1413 and the position marker D1414 are equal to a length, in the arrow-A direction (the tone-changing direction), of a single patch in the patch columns 20.

The marker 1411 indicates one side, of the four sides of the rectangular scanner-profile generation sheet 14A, that is to be aligned to an alignment reference on the platen 7A when placed on the platen 7A. The alignment reference on the platen 7A refers to a line, along which the reference position markers C613, A611, and B612 on the platen 7A are arranged (see FIG. 6).

A procedure for a scanner-profile creating process to be performed in the printer 10 according to the second embodiment will be described below. The scanner-profile creating process to be performed in the second embodiment is similar to that of the first embodiment (see FIG. 4). However, the scanner-profile creating process in the second embodiment differs from that in the first embodiment in that the scanner-profile generation sheet 14A is used in lieu of the scanner-profile generation sheet 14. The scanner-profile creating process in the second embodiment differs from that in the first embodiment in employing such first image data, from which an image that contains the patches on the scanner-profile generation sheet 14A is to be formed.

In the second embodiment, processing pertaining to Step S104 of FIG. 4 is performed as follows. In the second embodiment, the scanner unit 7 reads out the patches on the scanner-profile generation sheet 14A at the scanner positions on the platen 7A (Step S104). By the process at Step S104, the scanner control unit 9 obtains readout values of two or more patches of different tone values on the scanner-profile generation sheet 14A at each of the scanner positions on the platen 7A.

In the second embodiment, at Step S104, a user places on the platen 7A the scanner-profile generation sheet 14A such that a side, where the patch columns 20 and the like are formed, of the scanner-profile generation sheet 14A faces the platen 7A.

The user then adjusts the position of the scanner-profile generation sheet 14A so that the position of the reference position marker A611 provided on the platen 7A and the one side, which is parallel to the position marker C1413 and closest thereto, of the scanner-profile generation sheet 14A coincide with each other. Simultaneously, the user also adjusts orientation of the scanner-profile generation sheet 14A so that the direction (the arrow-A direction of FIG. 17), along which the patches on the scanner-profile generation sheet 14A are arranged, is parallel with the direction, along which the reference position markers C613, A611, and B612 on the platen 7A are arranged.

The scanner unit 7 reads out the scanner-profile generation sheet 14A in this state. The readout value calculating unit 9B calculates readout values of the individual patches on the scanner-profile generation sheet 14A based on the scanned image data received from the scanner unit 7. The method for calculating the readout values is the same as that of the first embodiment, and repeated description is omitted.

The scanner control unit 9 stores, in advance, information indicative of the scanner positions, at which the patches on each of the patch columns 20 are located when the scanner-profile generation sheet 14 is placed on the platen 7A such that the reference position marker A611 provided on the platen 7A coincides with the one side, which is parallel to the position marker C1413 and closest thereto, of the scanner-profile generation sheet 14A, in a form of being associated with information indicative of the patches. Therefore, the scanner control unit 9 can obtain the readout values of the individual patches on the scanner-profile generation sheet 14A and the scanner positions indicating the positions, at which the patches are read out on the platen 7A.

The scanner control unit 9 stores, in the storage unit 2, the obtained readout values of the individual patches, together with the information indicative of the patches and the tone values of the patches in the form of being associated with the information indicative of the scanner positions, at which the patches are read out on the platen 7A.

The scanner unit 7 also, similarly, reads out the scanner-profile generation sheet 14A folded along the reference position marker C1413 and placed on the platen 7A with reference to the reference position marker A611. The scanner unit 7 also reads out the scanner-profile generation sheet 14A folded along the reference position marker D1414 and placed on the platen 7A with reference to the reference position marker A611. The scanner control unit 9 obtains readout values of the patches on the scanner-profile generation sheet 14A from each of these scanning results.

More specifically, when placing the scanner-profile generation sheet 14A on the platen 7A, the user folds the scanner-profile generation sheet 14A along the reference position marker C1413 and places the thus-folded sheet on the platen 7A. The scanner unit 7 reads out the scanner-profile generation sheet 14A in this state. Furthermore, the user folds the scanner-profile generation sheet 14A along the reference position marker D1414 and places the thus-folded sheet on the platen 7A. The scanner unit 7 reads out the scanner-profile generation sheet 14A in this state.

This causes the scanner unit 7 to reads out three patches that are of a same color but of different tone values at a single position on the platen 7A. In the second embodiment, the scanner control unit 9 obtains readout values of three patches, or, more specifically, a first patch scanned first and two other patches that are adjacent to the first patch in the tone-changing direction, read out at the same position on the platen 7A.

The scanner control unit 9 stores, in the storage unit 2, the thus-obtained scanned values of the individual patches obtained by changing load positions of the scanner-profile generation sheet 14A, together with the information indicative of the patches and the tone values of the patches, in the form of being associated with the information indicative of the scanner positions, at which the individual patches are scanned on the platen 7A.

Thus, a scanner table, in which, for each of the scanner positions on the platen 7A, the scanned values of the two or more patches on the scanner-profile generation sheet 14A read out at a single scanner position and of different tone values are associated with the information indicative of the individual patches and the information indicative of the tone values of the individual patches, is stored in the storage unit 2.

In the second embodiment, the reference position marker B612 and the position marker C613 on the platen 7A are not used; accordingly, these reference position markers may or may not be provided in the scanner unit 7.

In the second embodiment, the scanner-profile generation sheet 14A is placed on the platen 7A in a state of being folded along the position marker C1413 or the position marker D1414. However, a method for causing a certain patch to be read out at a desired position on the platen 7A is not limited thereto. For instance, alternatively, the scanner-profile generation sheet 14A may be relocated on the platen 7A without being folded so that the position marker C1413 or the position marker D1414 coincides with the position marker A611.

The embodiments discussed above are exemplary embodiments of the present invention and may be modified in various manners without departing from the scope of the present invention. For instance, the scanner unit 7 provided in the printer (image processing apparatus) 10 may be configured as an independent, separate scanner device.

According to an aspect of the present invention, input characteristics of a scanning unit may be defined accurately and easily by using a relatively small number of printout sheets, and an accurate tone correction parameter may be created.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an output unit that outputs a tone-correction-parameter generation sheet and a scanner-profile generation sheet, patch columns being formed on each of the tone-correction-parameter generation sheet and the scanner-profile generation sheet, each of the patch columns containing a plurality of patches of different tone values and arranged in a predetermined direction, the tone-correction-parameter generation sheet and the scanner-profile generation sheet being identical in layout of the patch columns;
   a readout unit that reads out the patches of any one of the tone-correction-parameter generation sheet and the scanner-profile generation sheet placed on a platen at each of positions on the platen;
   a scanner-profile creating unit that creates a scanner profile for each of the scanner positions, the scanner profile specifying a relationship between readout values and first color measurement values, the readout values being obtained by reading out at least two patches of different tone values on the scanner-profile generation sheet at each of the positions on the platen, the first color measurement values being obtained by a colorimeter by measuring the at least two patches;
   a color-measurement-value deriving unit that obtains the first color measurement values of the patches, based on readout values obtained by reading out the patches on the tone-correction-parameter generation sheet and the scanner profiles that corresponds to the positions on the platen when the patches on the tone-correction-parameter generation sheet are being read out; and
   a calculating unit that calculates a tone correction parameter for use in correcting differences between second color measurement values and the first color measurement values, the second color measurement values being target color measurement values for the patches on the tone-correction-parameter generation sheet, wherein
   the scanner profile specifies a relationship between readout values and first color measurement values, the readout values being obtained by reading out at least two patches of different tone values and adjacent to each other on the scanner-profile generation sheet at each of the scanner positions on the platen, the first color measurement values being obtained by the colorimeter by measuring the at least two patches.

2. The image processing apparatus according to claim 1, wherein marks, each of the marks indicating a placement position where the scanner-profile generation sheet is to be placed, for use in scanning the at least two patches of different tone values on the scanner-profile generation sheet are formed on the platen.

3. The image processing apparatus according to claim 1, wherein a mark for use in scanning the at least two patches of different tone values, the mark indicating an alignment position, with reference to which the scanner-profile generation sheet is to be placed on the platen, is formed on the scanner-profile generation sheet.

\* \* \* \* \*